(12) United States Patent
Bardin et al.

(10) Patent No.: US 10,355,726 B2
(45) Date of Patent: Jul. 16, 2019

(54) WIDEBAND RECEIVER ARCHITECTURE TOLERANT TO IN-BAND INTERFERENCE

(71) Applicant: University of Massachusetts, Boston, MA (US)

(72) Inventors: Joseph Bardin, Hadley, MA (US); Mohammad Ghadiri-Sadrabadi, Amherst, MA (US)

(73) Assignee: University of Massachusetts, Boston, MA (US)

( * ) Notice: Subject to any disclaimer, the term of this patent is extended or adjusted under 35 U.S.C. 154(b) by 0 days.

(21) Appl. No.: 15/721,608

(22) Filed: Sep. 29, 2017

(65) Prior Publication Data

US 2018/0248575 A1    Aug. 30, 2018

Related U.S. Application Data

(60) Provisional application No. 62/401,339, filed on Sep. 29, 2016.

(51) Int. Cl.
*H04B 1/00* (2006.01)
*H04B 1/10* (2006.01)
*H04B 1/16* (2006.01)

(52) U.S. Cl.
CPC ......... *H04B 1/1027* (2013.01); *H04B 1/0046* (2013.01); *H04B 1/16* (2013.01)

(58) Field of Classification Search
CPC .......... H04B 1/1027; H04B 1/16; H04B 1/10; H04B 1/12
See application file for complete search history.

(56) References Cited

U.S. PATENT DOCUMENTS

2018/0063570 A1* 3/2018 Reddy ................ H04N 21/4382

OTHER PUBLICATIONS

Chen et al., *A Sub-Nyquist Rate Sampling Receiver Exploiting Compressive Sensing*, Circuits and Systems I: Regular Papers, IEEE Transactions, vol. 58, No. 3, pp. 507-520, Mar. 2011.
Haykin, *Cognitive radio: brain-empowered wireless communications*, Selected Areas in Communications, IEEE Journal, vol. 23, No. 2, pp. 201-220, Feb. 2005.

(Continued)

*Primary Examiner* — Nguyen T Vo
(74) *Attorney, Agent, or Firm* — Fish & Richardson P.C.

(57) ABSTRACT

A wideband receiver circuit is disclosed that includes a signal input configured to receive a spectrum signal of bandwidth B that contains an RF signal and an interference signal. A down conversion module is connected to the signal input and has N down conversion channels, wherein each of the N down conversion channels is configured to down convert the spectrum signal to one of N decimated baseband signals by processing the spectrum signal with one distinct phase of a sequence of length N and period N/fclk=N/2B to generate a baseband output signal. An amplifier circuit is connected to each of the N down conversion channels, and is configured to amplify the baseband output signal. A digital signal processing module including an analog to digital conversion circuit is connected to each amplifier circuit and is configured to convert the amplified baseband output signal to N digital signals. The digital signal processing module also having a digital reconstruction processor to combine each of the N digital signals and generate a reconstructed RF signal.

12 Claims, 8 Drawing Sheets

(56) References Cited

OTHER PUBLICATIONS

Mishali et al., *Xampling: Analog to digital at sub-nyquist rates,* Circuits, Devices Systems, IET, vol. 5, No. 1, pp. 8-20, Jan. 2011.
Yoo et al., *Design And Implementation Of A Fully Integrated Compressed-Sensing Signal Acquisition System,* Acoustics, Speech and Signal Processing (ICASSP), 2012 IEEE International Conference, pp. 5325-5328, Mar. 2012.
Yu et al., *Mixed-Signal Parallel Compressed Sensing And Reception For Cognitive Radio,* Acoustics, Speech and Signal Processing, 2008, ICASSP 2008, IEEE International Conference, pp. 3861-3864, Mar. 2008.

\* cited by examiner

WIDEBAND RECEIVER ARCHITECTURE TOLERANT TO IN-BAND INTERFERENCE

CROSS-REFERENCE TO RELATED APPLICATION

This application claims the benefit of U.S. Provisional Application No. 62/401,339, filed Sep. 29, 2016, and titled "Methods and Systems for Smoothing High-Linearity Wideband Receivers," which is expressly incorporated herein by reference.

GOVERNMENT FUNDING

This invention was made with government support under Award No. 1547278 awarded by the National Science Foundation (NSF). The government has certain rights in the invention.

TECHNICAL FIELD

This application relates to a wideband receiver circuit.

BACKGROUND

The realization of receiver systems operating with wide instantaneous bandwidth and tolerant to strong in-band blockers has been a long-standing challenge faced by CMOS circuit designers. Research has focused on developing circuit topologies that are able to mimic the rejection properties of off-chip filters. These approaches include n-path filters, mixer-first receiver architectures, filtering by aliasing, and compressive sensing based receivers, to name a few. One limitation of these techniques has been the inability to support large instantaneous fractional bandwidths.

The ideal receiver for future wireless communication systems will collect a very wide swath of spectrum and adaptively choose which parts of it to extract. In addition, as a result of the intense demand for spectrum for commercial uses, there is a decrease in the available spectrum for measurements that require extreme quiet such as remote sensing of the earth and radio astronomy. In these modern communications and remote sensing applications, the systems are interference-limited, and thus a significant issue for a receiver that covers a very wide bandwidth is that the RF input stages need to process spectra having very weak signals from a distant source mixed in with strong signals from nearby sources. Practical nonlinearities in current receivers make the separation of such signals a key barrier to the realization of these dynamic spectrum access systems. In order to remain adaptable, current receivers typically avoid fixed filters at their input and immediately use a low noise amplifier or active mixers to raise the signal level above the noise introduced by subsequent digital filtering. However, this approach introduces nonlinearity at the point where the as yet unfiltered interferers are large enough to cause distortion that can mask weaker signals. Therefore, there is a need for a receiver that mitigates the challenges imposed by these nonlinear components, hence greatly improving receivers that can process very wide bandwidths where interference is normally a critical limitation.

SUMMARY

This disclosure considers a receiver architecture that transforms wideband signal reception in the presence of potentially many strong interferers The disclosure includes two technical themes. First, random sequences have been employed for demodulation. Second, advances in CMOS device technology have led to high-speed switching circuits (multipliers) that can operate with very high linearity— much more linear than conventional active circuits such as low noise amplifiers. Research has shown that such circuits have sufficiently low noise to be used as the first downconversion elements in a receiver without an RF low noise amplifier. Thus, circuit technology has reached a point where demodulation can occur by projecting the broadband input onto a set of sequences, and the information in the input signal can be recovered. These circuits are tolerant to interferers occurs because the signal's dynamic range is reduced in the projections. In this disclosure, advanced, high linearity, integrated circuit techniques are combined with pulse sequence projection algorithms in order to obtain ultra-wideband, interference-tolerant, receiver designs.

A new signal-processing approach is described that improves the intermodulation performance of wideband receivers in CMOS technologies. The wideband receiver circuit includes N channels where each channel includes a mixer circuit, an integrator circuit, and a sample and hold circuit. The wideband receiver operates by downconverting the input signal to N decimated baseband signals using the N mixer circuits. The local oscillator signals used in this process and provided to the mixer circuits are preferably each a different phase of a $2^N-1$ pseudo-random bit sequence (PRBS). The recovered signal output of each mixer circuit is further processed by an integrator circuit (also referred to as an averager circuit) that operates to average the signal over a predetermined sequence period. The output of each integrator circuit is sampled at the end of each sequence period by a suitable sample and hold circuit. The baseband signals are then amplified and digitized before the original RF signal is reconstructed in the digital domain and provided as an output signal. A prototype integrated circuit was fabricated and laboratory testing demonstrates an in-band IIP3 of greater than 8 dBm was measured for an RF input bandwidth of 400 MHz. The blocker tolerance of the wideband receiver circuit was also characterized and it was found that a 10 MSps-50 dBm QAM 16 signal could be received with nearly constant EVM as the power of a blocker signal was swept from −20 to −7 dBm.

According to one innovative aspect of the subject matter described in this application, a wideband receiver circuit includes a signal input configured to receive a spectrum signal of bandwidth B that contains an RF signal and an interference signal. A down conversion module is connected to the signal input and has N down conversion channels, wherein each of the N down conversion channels is configured to down convert the spectrum signal to one of N decimated baseband signals by processing the spectrum signal with one distinct phase of a sequence of length N and period N/fclk=N/2B to generate a baseband output signal. An amplifier circuit is connected to each of the N down conversion channels, and is configured to amplify the baseband output signal. A digital signal processing module including an analog to digital conversion circuit is connected to each amplifier circuit and is configured to convert the amplified baseband output signal to N digital signals. The digital signal processing module also having a digital reconstruction processor to combine each of the N digital signals and generate a reconstructed RF signal.

The wideband receiver may include one or more of the following optional features. For example, each of the N down conversion channels may include a mixer circuit, wherein each mixer circuit may be configured to process the spectrum signal with a local oscillator signal and generate a baseband signal, where the local oscillator signal is one distinct phase of the sequence of length N and period $N/f_{clk}=N/2B$. Additionally, each of the N down conversion channels may include an integration circuit, wherein each integration circuit receives the baseband signal from the mixer circuit, and further processes the baseband signal by performing an averaging function over the sequence period, $T_s=N/2B$, and then samples the baseband signal at the end of each sequence period to generate a sampled baseband output signal. The integration circuit may be a switched capacitor circuit that performs the averaging function. The sequence may be a $2^N-1$ pseudo-random bit sequence (PRBS). In addition, signal swings of the baseband output signal may be suppressed. The down conversion module of the wideband receiver circuit may be a discrete-time signal processing module.

According to another innovative aspect of the subject matter described in this application, a wideband receiver includes a signal input configured to receive a spectrum signal of bandwidth B that contains one or more desired RF signal components and undesired noise and/or interference components, wherein the undesired components may be stronger than the RF signal components. A down conversion module is connected to the signal input and includes N down conversion channels, wherein each of the N down conversion channels is configured to down convert the spectrum signal to one of N decimated baseband signals. Each of the N down conversion channels includes a mixer circuit, wherein each mixer circuit is configured to process the spectrum signal with a local oscillator signal and generate a baseband signal, and the local oscillator signal is one distinct phase of a sequence of length N and period $N/f_{clk}=N/2B$. Each of the N down conversion channels further includes an integration circuit, wherein each integration circuit receives the baseband signal from the mixer circuit, and further processes the baseband signal by performing an averaging function over the sequence period, $T_s=N/2B$, and then sampling the baseband signal at the end of each sequence period to generate a sampled baseband output signal. A baseband amplifier circuit is connected to each of the N down conversion channels. The baseband amplifier is configured to amplify the sampled baseband output signal from the integration circuit. A digital signal processing module includes an analog to digital conversion circuit that is connected to each baseband amplifier circuit and is configured to convert the amplified baseband output signal to N digital signals, and includes a digital reconstruction processor to combine each of the N digital signals and generate a reconstructed RF signal.

The wideband receiver may include one or more of the following optional features. For example, the integration circuit may be a switched capacitor circuit that performs the averaging function. The sequence may be a $2^N-1$ pseudo-random bit sequence (PRBS). In addition, signal swings of the sampled baseband output signal may be suppressed. The down conversion module of the wideband receiver circuit may be a discrete-time signal processing module.

The details of one or more implementations of the subject matter described in this specification are set forth in the accompanying drawings and the description below. A particular advantage of these techniques is the improvement of the intermodulation performance of wideband receivers in CMOS technologies. Another advantage of the disclosed design of the wideband receiver is the ability to process a broader bandwidth spectrum signals in the presence of strong blockers. Other features, aspects, and advantages of the subject matter will become apparent from the description, the drawings, and the claims.

DETAILED DESCRIPTION

Figure 1A:
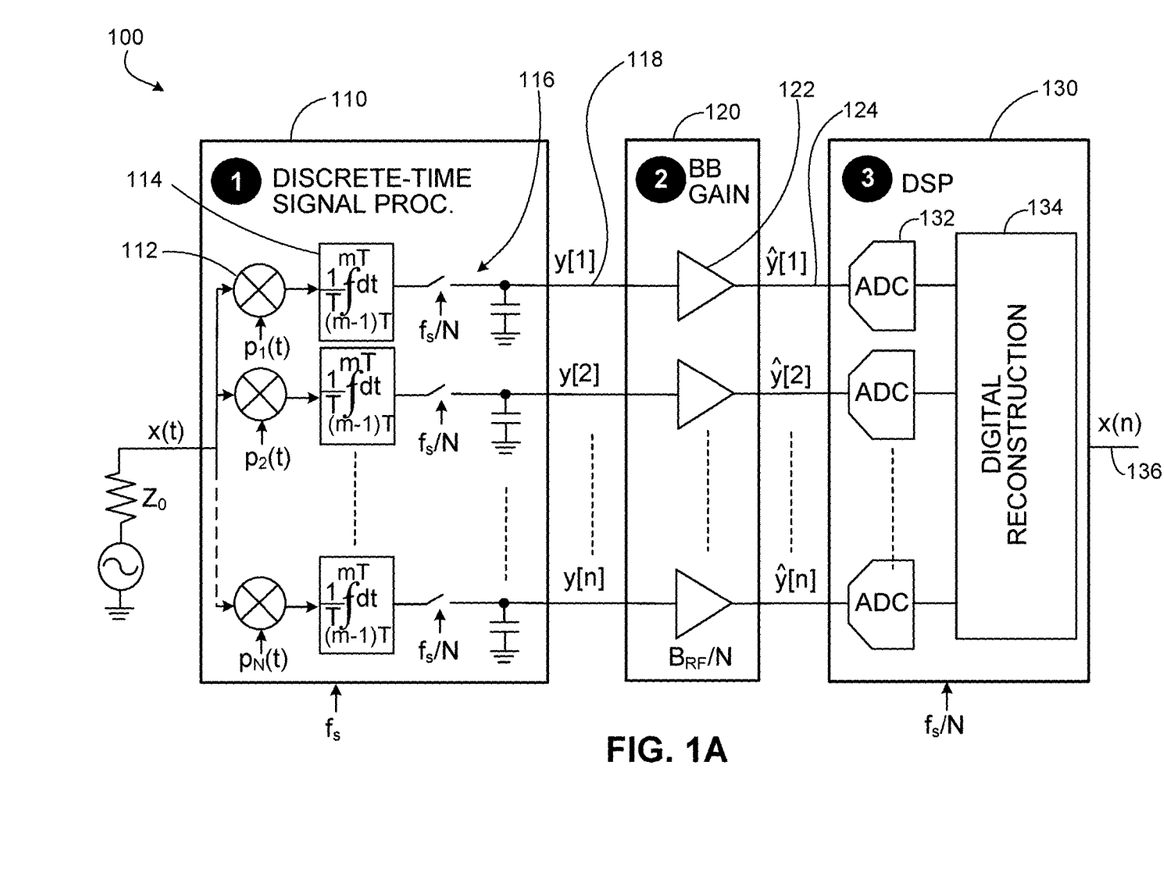
FIG. 1A illustrates a schematic diagram of the architecture for the wideband circuit.

A new wideband receiver architecture is described that is able to achieve high dynamic range while covering a large instantaneous bandwidth. FIG. 1A shows the basic architecture of the wideband receiver circuit 100 that includes an N-channel signal processor. In one exemplary implementation, the N-channel signal processor is an N-channel discrete-time switched-capacitor (DTSC) signal processor 110. However, it should be understood that the invention is not limited to a DTSC signal processor, and that the wideband receiver may be implemented with other types of signal processing circuits such as a continuous time integrator circuit. The N-channel DTSC signal processor 110 is connected to a baseband amplifier block 120 having N amplifiers 122, and then a digital signal processor block 130 having N analog to digital converter (ADC) circuits 132. Once the sampled signal is in the digital domain, a recovery procedure requiring minimal digital resources is employed within a digital signal reconstruction processor 134 to reconstruct the full bandwidth input signal. Each of the N channels in the DTSC signal processor 110 includes a mixer circuit 112, an integrator circuit 114, and a sample and hold circuit 116. The output from the sample and hold circuit 116 is provided at node 118 which is also connected to the input of a corresponding amplifier 122 within the amplifier block 120. The output from each of the N amplifiers 122 is provided at node 124 which is also connected to the input of a corresponding analog to digital converter (ADC) circuit 132 within the digital signal processor block 130.

For simplicity of explanation purposes, and without limiting the scope of the invention, N is chosen to be 15, and each of the blocks 110, 120, 130 of the wideband receiver circuit 100 will be described as having N=15 channels. It should be understood that the wideband receiver circuit 100 may have more or less channels, for example, N=7, N=15, N=31. Thus, the DTSC signal processor 110, the baseband amplifier block 120, and the digital signal processing block 130 are also understood to include fifteen channels based on the selection of N=15 for explanation purposes. Each channel within the DTSC signal processor 110 also includes its own local oscillator generator circuit (not specifically shown) that provides a local oscillator signal to the corresponding mixer circuit 112. One exemplary implementation of a local oscillator generator employs an N-bit circular shift register. This approach has the advantage of minimizing the effects of timing skew and mismatch.

With reference to FIG. 1A, as a high level operation, the N channel DTSC signal processor 110 projects N distinct sequences onto the RF input signal and provides an integrated output (118) every N clock cycles. Prior to amplification, the RF input signal (FIG. 1B) passes through the DTSC signal processor 110. The RF input signal is first mixed with a set of N different phases of an N bit psuedo-random bit sequence (PRBS) by the corresponding mixer circuits 112. The bit sequence provided as the local oscillator signal to the mixer circuit 112 is generated by a shift register based PRBS generator (not specifically shown) that may be built into the CMOS architecture of the receiver chip. The output of each mixer circuit 112 is then averaged by the integrator circuit 114 over the sequence period, $T_s=NT_s$, and the output of each integrator circuit 114 is sampled at the end of each sequence period (FIG. 1C) by the sample and hold circuit 116. Thus, at any given time, the output of each sample and hold circuit 116 is the inner product of the RF input signal and the corresponding normalized PRBS, $p_j/N$, over the preceding sequence period. The sampled outputs are then amplified by the amplifier 122 and digitized by the ADC 132 at a rate of $f_s/N$. Finally, a discretized version of the RF input signal is reconstructed from the N digitized baseband signals (FIG. 1D) within the digital signal reconstruction processor 134.

To further understand the operating principles of the wideband receiver circuit 100, consider a single sequence period from t=0 to $t=T_s$. Assuming an input signal that is band-limited to $f_s/2$, the sampled voltages may be related to the input signal as $$y = Px, \quad (1)$$

where y is a vector containing the N sampled voltages, x is a vector of length N containing time domain values of the input signal, sampled at $1/f_s$, and P is an N×N matrix, in which row j contains switching sequence $p_j$, normalized to its length. It is apparent the vector x may be determined from y, since P (the N×N matrix) is invertible. It should also be pointed out that, since P is a deterministic matrix, once it is known, the inverse of this matrix yields a simple mapping through linear superposition from the measured baseband vectors (y) back to the full-rate input signal (x).

Figure 1B:
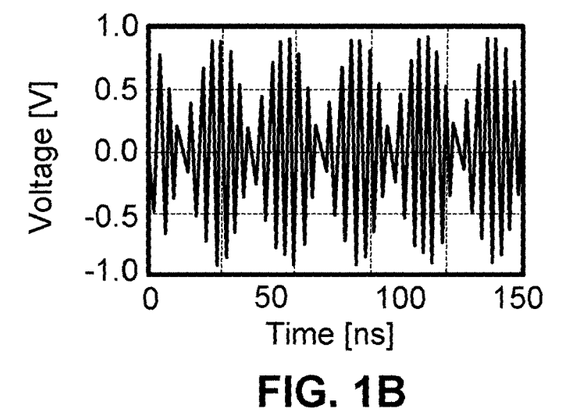
FIGS. 1B-1D illustrate example waveforms at different points of the wideband receiver circuit.
Figure 1C:
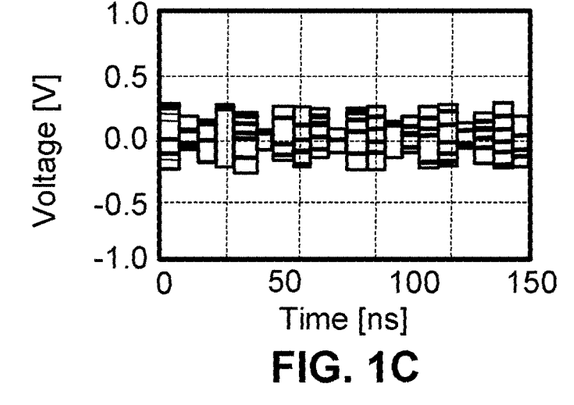
Figure 1D:
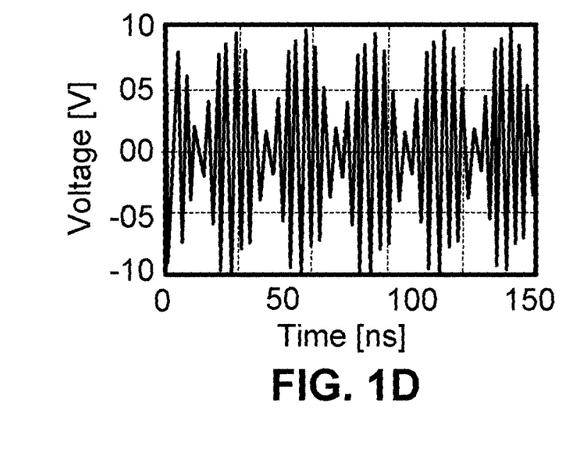

FIGS. 1B-1D show example waveforms at different points of the wideband receiver circuit 100. The voltage signal swings are greatly suppressed prior to analog amplification in such a way that the signal can be recovered in the digital domain. More specifically, FIG. 1B shows an example of a RF input signal waveform x(t) provided as an input to the N channel DTSC signal processor 110. FIG. 1C shows all fifteen of the baseband waveforms y[i] (where i=1 to 15) superimposed on one graph where each waveform represents the output of one of the N=15 channels of the DTSC signal processor 110 at node 118. FIG. 1D shows the reconstructed waveform x[n] as the output from the digital signal reconstruction processor 134. A comparison of FIG. 1D with FIG. 1B illustrates that the reconstructed waveform x[n] (136) generated by the digital signal reconstruction processor 134 matches the RF input signal waveform x(t) provided as input to the DTSC signal processor 110.

One function of the N-channel DTSC signal processor 110 is to reduce signal swings and decimate the bandwidth of the RF input signal by a factor of N prior to amplification. Since the linearity of active circuits is ultimately limited by voltage swings, this smoothing of the signal swings greatly reduces the signal handling requirements of the subsequent active electronics. Moreover, since the DTSC signal processor 110 also serves to decimate the bandwidth by a factor of N, baseband design techniques can be used for the active circuitry, thus making it possible to implement amplification blocks, such as baseband amplifier block 120, that achieve low-noise and high linearity simultaneously.

The N-channel DTSC signal processor 110 is low-loss, and is able to suppress signal swings and arbitrary frequency components while enabling efficient and complete signal recovery. In one implementation, a 15-channel DTSC signal processor 110 based upon an orthogonal pseudo-random basis set is demonstrated. For the purpose of this disclosure, circuits covering the DC-1 GHz frequency range using a mature CMOS circuit components and processes were designed. However, it should be noted that the general techniques are scalable to larger instantaneous bandwidths and can also be applied to bandpass systems.

As a basic demonstration of the topology described herein, a wideband receiver circuit 100 based upon DTSC signal processor 110 is implemented that projects a broadband RF input signal onto N pseudo-random bit sequences (PRBS), thereby reducing the peak signal swings by approximately sqrt(N) prior to amplification. With reference to FIG. 1A, $p_1(t)$ to $p_N(t)$ shown as input signals to each mixer circuit 112 are the N different phases of the N-bit PRBS. It should also be noted that for discussion purposes it is assumed that the RF input signal is uncorrelated with the PRBS signals. Mathematically, the effect of the PRBS-based DTSC pre-processor for the case of N=15 can be described through the matrix relationship $$y = \underbrace{\frac{1}{15}\begin{bmatrix} 1 & 1 & 1 & 1 & -1 & -1 & -1 & 1 & -1 & -1 & 1 & 1 & -1 & 1 & -1 \\ -1 & 1 & 1 & 1 & 1 & -1 & -1 & -1 & 1 & -1 & -1 & 1 & 1 & -1 & 1 \\ 1 & -1 & 1 & 1 & 1 & 1 & -1 & -1 & -1 & 1 & -1 & -1 & 1 & 1 & -1 \\ -1 & 1 & -1 & 1 & 1 & 1 & 1 & -1 & -1 & -1 & 1 & -1 & -1 & 1 & 1 \\ 1 & -1 & 1 & -1 & 1 & 1 & 1 & 1 & -1 & -1 & -1 & 1 & -1 & -1 & 1 \\ & & & & & & & \vdots & & & & & & & \\ 1 & 1 & 1 & -1 & -1 & -1 & 1 & -1 & -1 & 1 & 1 & -1 & 1 & -1 & 1 \end{bmatrix}}_{P} x, \quad (1)$$

where P is a matrix containing the N PRBS signals, x is a vector of time-domain samples, and y is a vector containing the N decimated output samples. Since the matrix P is invertible, the discrete time-domain signal x can be reconstructed at full bandwidth in the digital domain from the amplified and digitized version of y.

An analysis of the key performance metrics of the wideband receiver circuit 100 is described below. The overall equivalent noise of the system may be determined by input referring the independent noise contribution from each of the chains to the input of the wideband receiver 100. Assuming the total noise of each baseband chain at the input 118 of the baseband amplifier 122 to be band-limited to $f_s/N$, have a normal distribution with zero mean and a standard deviation of $\sigma_N$ the effect of matrix multiplication can be analyzed. It can be shown that the power spectral density (PSD) of $\hat{p}_j$ in the digital signal reconstruction processor 134 can be written as, $$S_{\hat{p}} = \delta(f) + \sum_{k=1}^{(N-1)/2} \frac{1}{N+1} \delta\left(f \pm k\frac{f_s}{N}\right). \quad (10)$$

Each channel in the digital signal reconstruction processor 134 may use a zero-order hold (ZOH) block that upconverts the noise of each baseband output and modulates it with a $sinc^2$ function. By convolving this noise at the output of each ZOH block with the PSD in eq. (10) the effect of each individual channel at the output is found. The total voltage noise spectrum at the output after reconstruction is N times that of each individual channel and can be written as, $$S_N = N\sigma_N^2 \left[ sinc^2(fNT_s) + \sum_{k=1}^{(N-1)/2} \frac{sinc^2((f \pm kf_s)NT_s)}{N+1} \right] \quad (11)$$

Eq. (11) shows that the output noise will have N+1 times higher noise at DC. However over the frequency band from $f_s/N$ to $f_s/2$ output voltage noise spectral density is close to the baseband noise level of each channel.

The overall noise figure of the system can be derived in terms of $W_0$ (V/sqrt (Hz)) which is the voltage noise spectrum density of each channel referred to the input 118 of the baseband amplifier 122. Using results from eq. (11) and assuming the wideband receiver 100 operates in the frequency range between $f_s/N$ and $(N+1)f_s/N$ the noise figure can be written as $$NF \approx 10\log_{10}\left(1 + \frac{1-\alpha}{\alpha}\frac{T_a}{T_0} + \frac{W_0^2}{\alpha k T_0 R_S}\right), \quad (12)$$

where $\alpha$ is the loss factor in the sampling circuit, k is the Boltzmann constant, $T_0$=290 K is the reference temperature, $T_a$ is the physical temperature, and $R_s$ is the generator impedance.

Linearity: As discussed above, the spreading and integration operations have the effect of reducing signal swings by a factor of $\sqrt{N}$, where N is the length of the spreading sequence. Therefore, the linearity can be improved by a factor of 10 log 10 {N} from that of each baseband amplifier. Assuming a base-band gain of 20 dB, and an output swing of 3 $V_{pk-pk}$ differential from each amplifier 5 at the 1 dB compression point, then the input-referred third-order intermodulation intercept of each amplifier is approximately 470 mV peak differential, or ≈0 dBm referred to 100Ω. Thus, the in-band I IP3 of the system in this case would be 11.7 dBm. It should be noted that the output swing of 3 $V_{pk-pk}$ differential from each amplifier was selected to ensure linearity is maintained when driving a typical ADC chip.

Figure 2A:
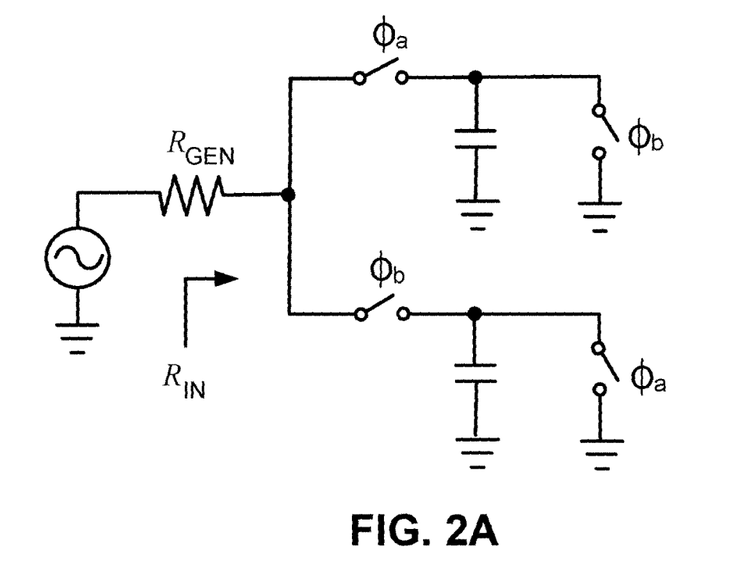
FIGS. 2A-B illustrate a circuit and timing diagram used for analysis of equivalent input impedance.
Figure 2B:
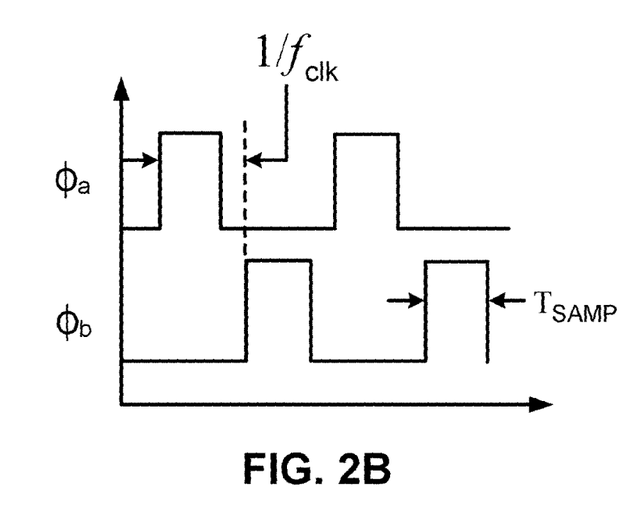

Impedance Match: The analysis of impedance in switched capacitor circuits is generally well known. The input impedance to the DTSC signal processors 110 described herein can be determined by analyzing the circuit of FIG. 2A and also the circuit of FIG. 4A. FIG. 2B shows a timing diagram associated with FIG. 2A. It can be shown that, for frequencies well below the clock frequency, $R_{IN}$ is approximately given as $R_{IN} \approx R_{GEN} [1/f_{clk} R_{GEN} C (1-\exp\{-T_{SAMP}/\tau\})-1]$, where $f_{clk}$ is the clock period, $R_{GEN}$ is the generator resistance, $\tau = (R_{SW}+R_{GEN}) C$, $R_{SW}$ is the switch on-resistance, and $T_{SAMP}$ is the sampling pulse width. Thus, at low frequencies, the input impedance is weakly dependent upon the switch resistance and can be set by the total sampling capacitance C. At higher frequencies the analysis becomes a bit more complicated as a reactive component appears in the input impedance. However, based upon realistic periodic steady-state simulations carried out in a design environment such as the Cadence® Virtuoso® design environment, it appears realistic to achieve better than 15 dB return loss from DC-1 GHz using a simple L-C matching network.

Harmonic and Local Oscillator Re-radiation: A concern when connecting a switched-capacitor circuit to an antenna is harmonic and local oscillator re-radiation. In the context of the wideband receiver circuit 100, reflected power can also lead to coupling between the channels. To prevent channel-channel coupling, switched capacitor circuits of the form shown in FIG. 2A are implemented, where all sampling capacitors are discharged before the relevant sampling switch is enabled. Simulations indicate that harmonic or local oscillator re-radiation is not expected to be a problem for the case when the fundamental frequency is impedance matched.

Figure 3A:
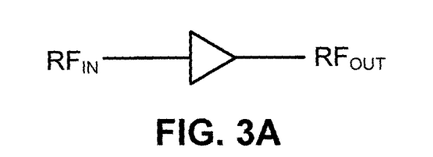
FIGS. 3A-D illustrate a baseline block diagram of the wideband receiver circuit and system level simulation results.
Figure 3B:
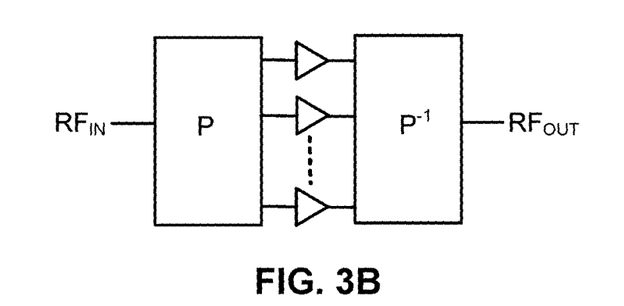
Figure 3C:
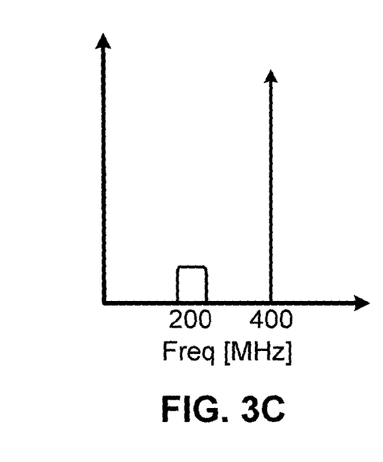
Figure 3D:
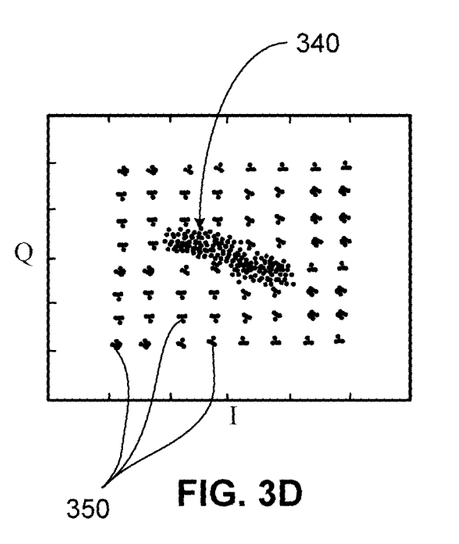

Matlab® System Simulations: A numerical simulation of the wide band receiver circuit 100 was carried out in Matlab® and the performance was compared to that of a typical amplifier-first approach. Block diagrams of the simulated reference and orthogonal projection based receiver configurations appear in FIGS. 3A and 3B. A -60 dBm QAM-64 signal with a carrier frequency of 200 MHz was combined with a -7 dBm CW signal at 402 MHz to create the input stimulus. The symbol rate for the QAM 64 signal was 13.3 Msymbols/second, corresponding to an overall data rate of 80 Mbps. Both phase and thermal noise were incorporated into the simulation, with the phase noise spectrum corresponding to a 200 MHz crystal oscillator that has been frequency multiplied to $f_{clk}$=2 GHz. The amplifier non-linearity was modelled as a simple third-order non-linearity corresponding to an input-referred 1 dB compression point of -13 dBm in a 100Ω system (100 mV peak differential). The same non-linearity was employed in both the baseband amplifiers and the reference path. The simulation was carried out for 60 μs and the constellation was recovered for each case. FIG. 3D shows the output constellation for the demodulated QAM signals corresponding to a baseline system (cluster 340) and the wideband receiver circuit 100 (constellation 350). For the amplifier-first approach (tight cluster of blue symbols) 340, the amplifier non-linearity due to the -7 dBm blocker signal renders the constellation distorted to the extent that the data cannot be recovered. However, when employing the approach implemented by the wideband receiver circuit 100 described herein, the constellation (evenly spaced constellation of red symbols) 350 remains clean despite the presence of the large blocking signal.

Figure 4A:
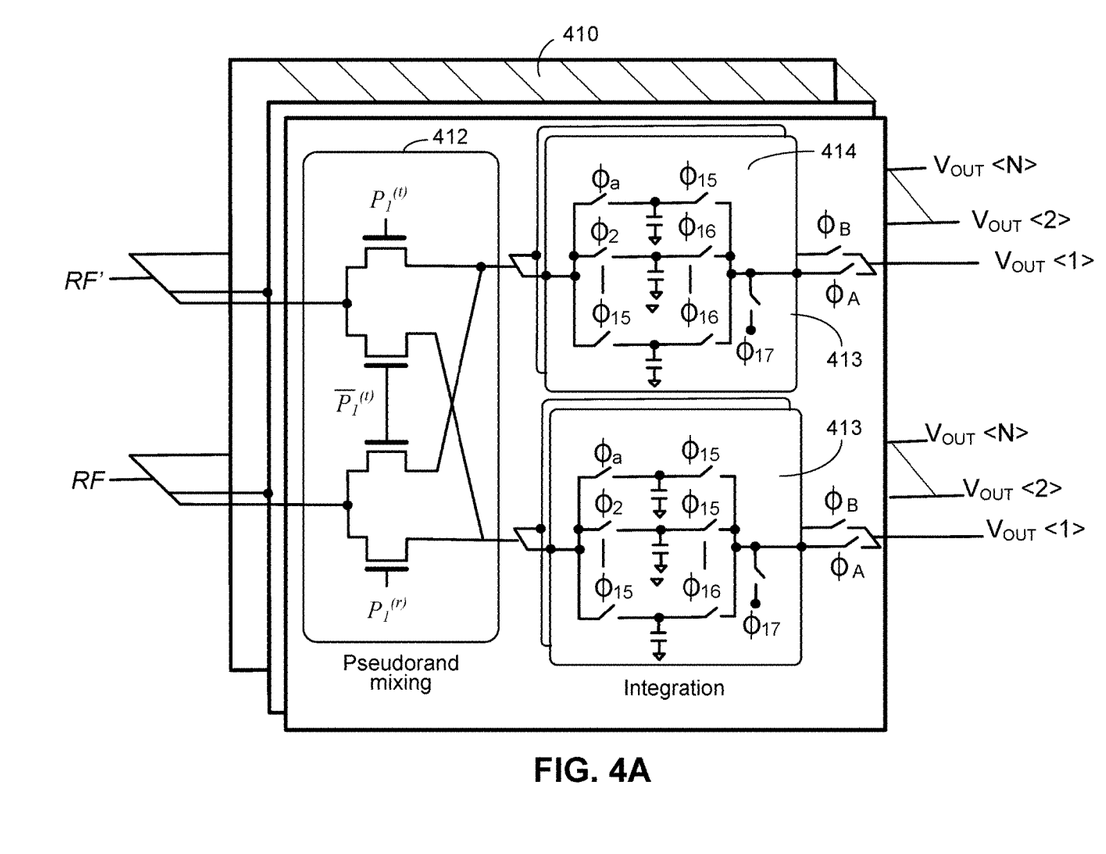
FIGS. 4A-4B illustrate a schematic diagram of the N-channel signal processing circuit shown with a timing diagram for the switched capacitor averaging circuit.
Figure 4B:
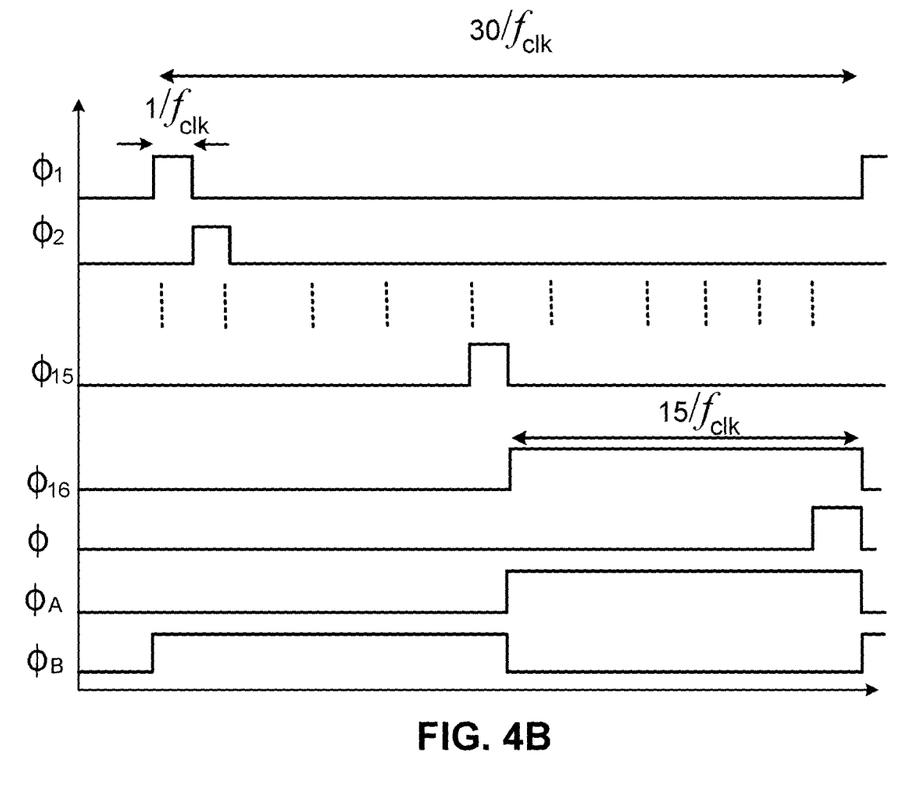

Cadence® Transistor Level Simulations: Using a 130 nm CMOS PDK, a preliminary transistor-level simulation of one implementation of the passive front-end pre-processor, such as DTSC signal processor 110, was carried out to demonstrate the feasibility of the wideband receiver design. FIG. 4A shows the simulated hardware configuration for the DTSC signal processor 410. Fifteen channels were operated in parallel, with the mixer circuit 412 of each channel driven by its own 15-bit PRBS signal. Generation of the local oscillator PRBS signals was accomplished using a single 15-bit shift register implemented using CMOS logic. The clocking frequency was set to 1 GHz, corresponding to a 0-0.5 GHz acquisition bandwidth. Integration of the output of each mixer circuit 412 was implemented using a pair of switched-capacitor FIR averaging circuits 413, with one of the two circuits sampling at all times (see the timing diagram in FIG. 4B). $\phi_A$ and $\phi_B$ switch between integration channels to permit continuous sampling of the modulated RF input. The two circuits are operated in parallel such that one capacitor is always sampling. A fully differential configuration was employed to minimize the effect of charge injection.

Figure 4C:
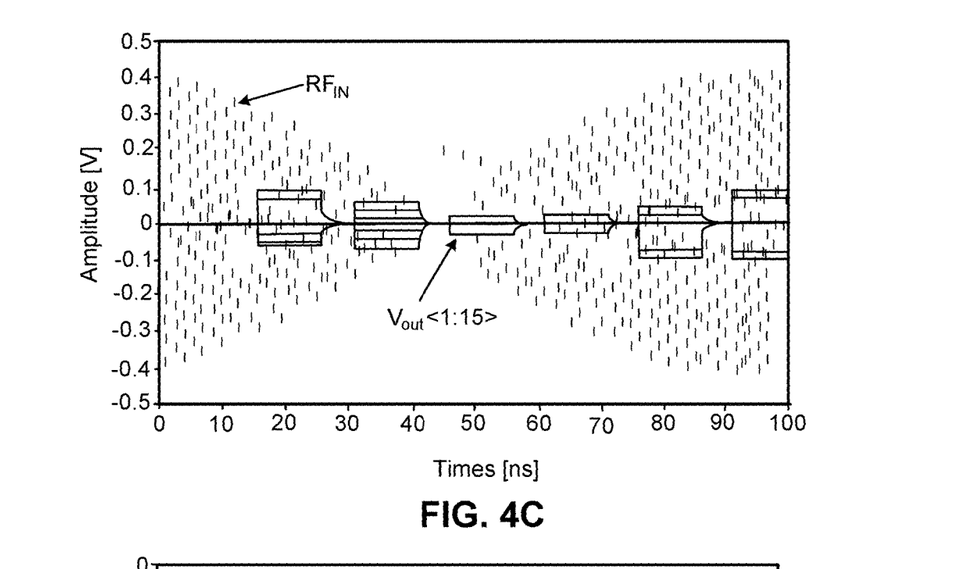
FIGS. 4C-4F illustrate graphs of time domain and frequency domain signals processed by the wideband receiver circuit.
Figure 4D:
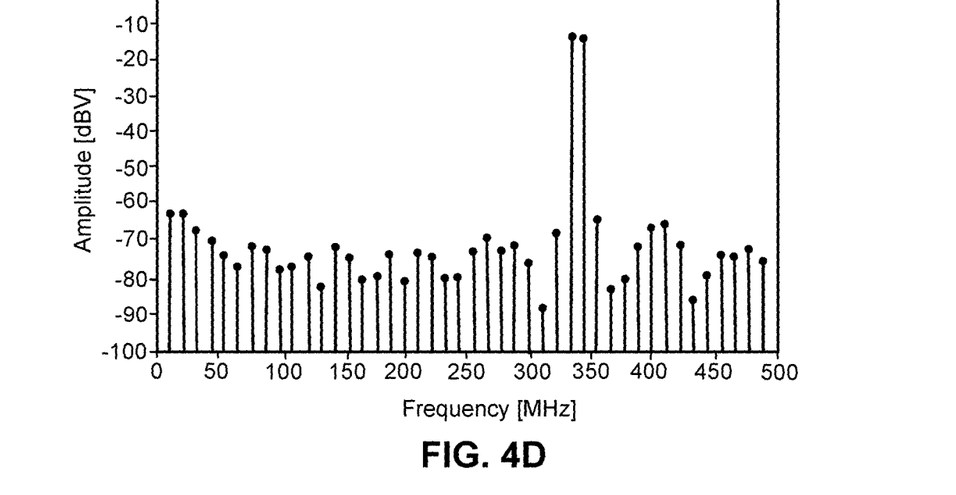

In one experiment, the circuit was driven by a closely spaced pair of 200 mV peak-differential signals at $f_{clk} \times 30/90$ and $f_{clk} \times 31/90$, respectively. These frequencies were selected to fall into unique and adjacent frequency bins when taking an FFT over 90 ns worth of data (i.e., 90 samples). Using Cadence® Virtuoso®, a transient simulation of 100 ns duration was carried out and the results were sent to Matlab® for further processing. The RF input appears in FIG. 4C along with each of the fifteen sampled differential outputs, $v_{out}$ (1:15). The projection of the fifteen PRBS sequences on the time domain data along with the integration operation results in suppression of the peak voltage swings by a factor of $\sqrt{15}$, thereby easing the linearity requirement on subsequent active electronics. Output vectors of length fifteen—corresponding to the y vectors in FIG. 1A—were generated by sampling the differential outputs shown in FIG. 4C at $f_{clk}/15$. For each y vector, reconstruction of the full Nyquist data rate was accomplished through multiplication of y by the inverse PRBS matrix. With no hardware optimization, this transform requires fifteen eight-input addition operations, and is suitable for implementation in digital hardware. The FFT spectrum of the 90 ns reconstruction appears in FIG. 4D which shows the spectrum of the recovered two-tone signal. The dynamic range of the reconstructed signal is approximately 50 dB, which is limited by charge injection in the unoptimized switched capacitor circuit as well as inter-channel coupling related to stray capacitance between the mixers and the sampling capacitors.

Figure 4E:
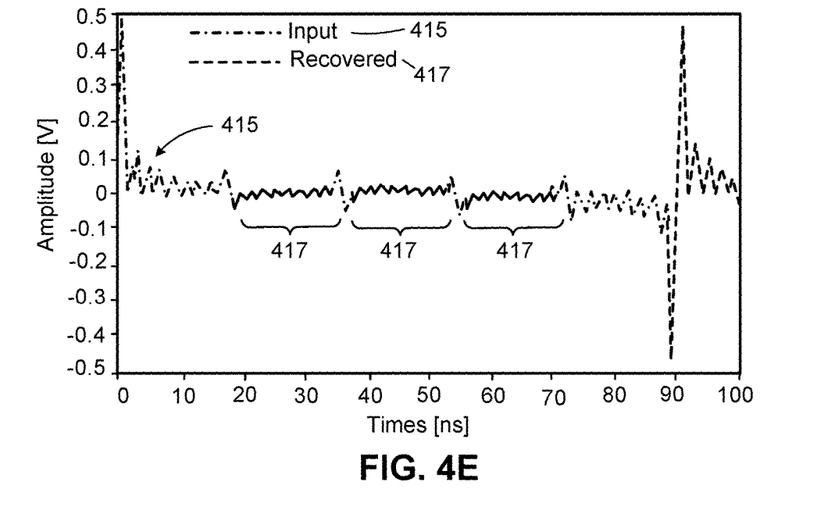
Figure 4F:
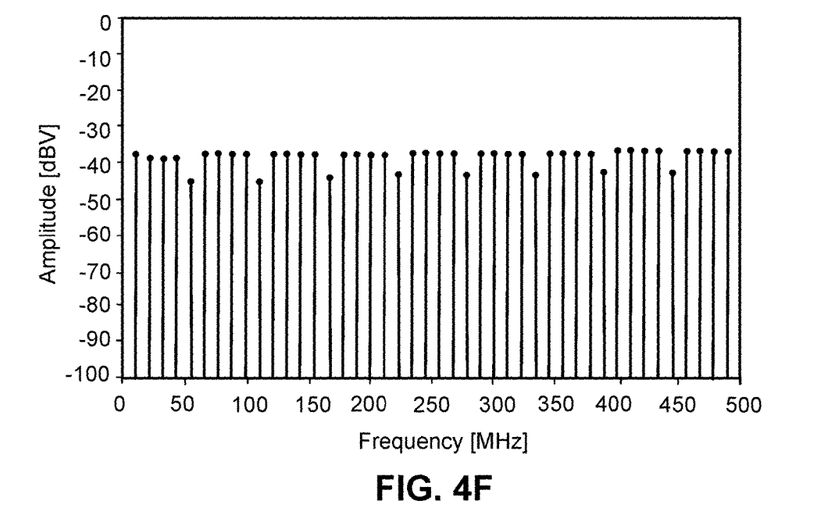

In another experiment, the circuit was stimulated with a 44-tone excitation, such that for a 90 ns simulation interval, all but one available frequency was occupied. The magnitude of every fifth tone was set to half of that of the other tones and each tone had an initial phase of 0 (zero) degrees. The resulting waveform is the dispersed wide-band pulse shown in FIG. 4E which shows the input (blue dashed lines 415) and reconstruction (red dotted lines 417) signals for the 44-tone simulation. Again, the data were ported to Matlab®, sampled, and multiplied by the inverse PRBS matrix to generate the reconstructed signal. The time and frequency domain results appear in FIGS. 4E and 4F, respectively. The results of this wideband simulation demonstrate excellent agreement between input and recovered signals in both the time and frequency domains. With reference to FIG. 4E, the reconstructed signal represented by the dotted lines 417 closely matches the waveform of the RF input signal represented by dashed lines 415.

Mismatch: Systematic errors will result from unavoidable random mismatch such as the effective weighting of each sampling capacitor and DC offset/gain errors in each baseband amplifier 122. Taking these errors into account, the vector of voltage amplitudes at the output of the baseband amplifiers 122 can be written as y=gBB (AEx+o), where E is a matrix describing mismatch and o is a vector of DC offsets. For the proposed system to work, it is critical that E and o are systematically determined. This can be accomplished through a calibration procedure in which the system is excited by an attenuated version of each phase of the PRBS and its complement. Defining, YA=gBB ($\alpha$AEA+diag (o) U) and YB=-gBB ($\alpha$AEA-diag (o) U), where U is a matrix with each element equal to unity, the product of the ideal baseband gain and the DC offset vector is given as gBBdiag (o) U=(YA+YB)/2, whereas the normalized error matrix is given as E=A-1 (YA/2-YB/2) A-1. Such a calibration scheme can be carried out with low overhead.

Clock and RF Skew: A related problem is relative skew between the clock signals around the chip, resulting in a distribution of sampling times. Ultimately, such deterministic jitter will limit the dynamic range as the noise floor will increase in the presence of large signals. To minimize this effect, h-tree distribution networks or other delay matching approaches can be employed for both the RF and the clock.

From a review of this disclosure, it might appear that the system architecture of the wideband receiver circuit 100 described herein is essentially a code-division multiple-access (CDMA) system. In particular, on a given branch, the received signal is multiplied by a wideband sequence, hence spreading the interferer, and then integrated. There have been numerous variants of CDMA systems considered over the last twenty years, ranging from standard CDMA systems to those that spread in the frequency domain, and various combinations. Some of these employ multi-code approaches, which have multiple de-spreading arms for a given user. However, the system architecture of the wideband receiver circuit 100 described herein is vastly different. First, from a systems perspective, CDMA receivers are paired with a very specific transmission technique, rather than providing full-band recovery of any wideband signal. To make this contrast stark, the wideband receiver circuit 100 can be employed in applications such as radio astronomy in the presence of strong adjacent band interferers, whereas CDMA receivers could not. Because of this difference in application, the key challenges in sequence and circuit design, in particular the co-design of effective filtering sequences that support full-band recovery and matched circuit architectures, are absent from the CDMA literature. The circuit architecture of the wideband receiver circuit 100 is also quite different than that generally employed for CDMA. Upon reception, a CDMA signal is generally filtered, amplified, downconverted, digitized, despread and detected, because CDMA is narrowband relative to the solution implemented by the wideband receiver circuit 100. The despreading in the disclosed wideband receiver 100 spreads a narrowband blocker, and this helps reduce dynamic range; however, despreading typically happens after downconversion and usually after digitization. Thus, RF amplification is necessary, and unless pre-filtering occurs, blockers can interact with the nonlinearities in the amplifier/downconverter to increase in-band interference. In current multiband commercial receivers, pre-filtering involves tens of filters and a complex switching system, increasing the noise and complexity of the system.

Compressive Sampling RF Receivers: An expert in the area in RF circuits may also note a resemblance between the architecture of the wideband receiver circuit 100 other known compressive sampling RF receiver architectures. However, such compressive sampling architectures suffer from two key limitations. Firstly, since compression is obtained by under-sampling, noise folding causes the signal-to-noise of such systems to be inherently worse than what can be achieved using a more standard architecture. Secondly, reconstruction of the RF signal requires the minimization of an $l_1$ norm, which is hardware intensive. Finally, an underlying assumption of signal sparsity (usually in the spectral domain) is required. On the contrary, the disclosed wideband receiver circuit 100 does not exploit sub-sampling and is therefore not subject to noise folding effects, and signal reconstruction can be accomplished for arbitrary (e.g., non-sparse) signals through a linear superposition operation, which is easily implemented in hardware.

The topology for the wideband receiver circuit 100 shown in FIG. 1A can be thought of as a bank of N sequence-defined FIR filters, each followed by a 1/N sampling-rate decimation. The sequences defining the effective FIR filter tap weights, pn, are selected to be delayed pseudo-random bit sequences. As such sequences are white in the frequency domain, the equivalent FIR filters will have all-pass characteristics within the Nyquist bandwidth and each frequency component folds to baseband during the decimation process. Since each of the N sequences is sampling a different aspect of the wideband RF input, the information contained in the decimated outputs of the N channels is sufficient to recover the full Nyquist-bandwidth input signal.

Although a few implementations have been described in detail above, other modifications are possible. For example, the signal processing block could be implemented with continuous time integrators rather than a switched capacitor circuit. In other alternate implementations a different basis set may be used (e.g., Hadamard Sequences or Gold Codes) in place of pseudo random bit sequences. Accordingly, other implementations are within the scope of the following claims.

What is claimed is:

1. A wideband receiver circuit comprising:
   a signal input configured to receive a spectrum signal of bandwidth B that contains an RF signal and an interference signal;
   a down conversion module connected to the signal input and having N down conversion channels, wherein each of the N down conversion channels is configured to down convert the spectrum signal to one of N decimated baseband signals by processing the spectrum signal with one distinct phase of a sequence of length N and period $N/f_{clk}=N/2B$ to generate a baseband output signal, wherein $f_{clk}$ is a clock period for the wideband receiver circuit;
   an amplifier circuit connected to each of the N down conversion channels, wherein the amplifier circuit is configured to amplify the baseband output signal; and
   a digital signal processing module having an analog to digital conversion circuit connected to each amplifier circuit and configured to convert the amplified baseband output signal to N digital signals, and a digital reconstruction processor to combine each of the N digital signals and generate a reconstructed RF signal.

2. The wideband receiver circuit of claim 1, wherein each of the N down conversion channels includes a mixer circuit, wherein each mixer circuit is configured to process the spectrum signal with a local oscillator signal and generate a baseband signal, and wherein the local oscillator signal is one distinct phase of the sequence of length N and period $N/f_{clk}=N/2B$.

3. The wideband receiver circuit of claim 2, wherein each of the N down conversion channels includes an integration circuit, and wherein each integration circuit receives the baseband signal from the mixer circuit and further processes the baseband signal by performing an averaging function over a sequence period, $T_s=N/2B$, and then sampling the baseband signal at the end of each sequence period to generate a sampled baseband output signal.

4. The wideband receiver circuit of claim 3, wherein the integration circuit is a switched capacitor circuit that performs the averaging function.

5. The wideband receiver circuit of claim 1, wherein the sequence is a $2^N-1$ pseudo-random bit sequence (PRBS).

6. The wideband receiver circuit of claim 1, wherein signal swings of the baseband output signal have been suppressed.

7. The wideband receiver circuit of claim 1, wherein the down conversion module further comprises a discrete-time signal processing module.

8. A wideband receiver circuit comprising:
   a signal input configured to receive a spectrum signal of bandwidth B that contains one or more desired RF signal components and undesired noise and/or interference components, wherein the undesired components may be stronger than the RF signal components;
   a down conversion module connected to the signal input and having N down conversion channels, wherein each of the N down conversion channels is configured to down convert the spectrum signal to one of N decimated baseband signals,
      wherein each of the N down conversion channels includes a mixer circuit configured to process the spectrum signal with a local oscillator signal and generate a baseband signal, wherein the local oscillator signal is one distinct phase of a sequence of length N and period $N/f_{clk}=N/2B$ and wherein $f_{clk}$ is a clock period for the wideband receiver circuit,
      wherein each of the N down conversion channels further includes an integration circuit, wherein each integration circuit receives the baseband signal from the mixer circuit and further processes the baseband signal by performing an averaging function over a sequence period, $T_s=N/2B$, and then sampling the baseband signal at the end of each sequence period to generate a sampled baseband output signal;
   a baseband amplifier circuit connected to each of the N down conversion channels wherein the baseband amplifier is configured to amplify the sampled baseband output signal from the integration circuit; and
   a digital signal processing module having an analog to digital conversion circuit connected to each baseband amplifier circuit and configured to convert the amplified baseband output signal to N digital signals, and a digital reconstruction processor to combine each of the N digital signals and generate a reconstructed RF signal.

9. The wideband receiver circuit of claim 8, wherein the integration circuit is a switched capacitor circuit that performs the averaging function.

10. The wideband receiver circuit of claim 8, wherein the sequence is a $2^N-1$ pseudo-random bit sequence (PRBS).

11. The wideband receiver circuit of claim 8, wherein signal swings of the sampled baseband output signal have been suppressed.

12. The wideband receiver circuit of claim 8, wherein the down conversion module further comprises a discrete-time signal processing module.

\* \* \* \* \*

UNITED STATES PATENT AND TRADEMARK OFFICE
CERTIFICATE OF CORRECTION

PATENT NO. : 10,355,726 B2
APPLICATION NO. : 15/721608
DATED : July 16, 2019
INVENTOR(S) : Joseph Bardin and Mohammad Ghadiri-Sadrabadi Page 1 of 1

It is certified that error appears in the above-identified patent and that said Letters Patent is hereby corrected as shown below:

In the Claims

Column 11, Line 42:
In Claim 1, delete "circuit" and insert -- circuit, --, therefor.

Column 12, Line 50:
In Claim 8, delete "channels" and insert -- channels, --, therefor.

Signed and Sealed this
Twenty-ninth Day of October, 2019

Andrei Iancu
*Director of the United States Patent and Trademark Office*